United States Patent
Friend et al.

(10) Patent No.: US 9,529,092 B2
(45) Date of Patent: Dec. 27, 2016

(54) POSITIONING ERROR DETECTION AND MITIGATION SYSTEM AND METHOD

(71) Applicant: Caterpillar Inc., Peoria, IL (US)

(72) Inventors: Paul R. Friend, Morton, IL (US);
Michael Taylor, Swissvale, PA (US);
Steven R. Krause, Chillicothe, IL (US);
Andrew Whitten, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 731 days.

(21) Appl. No.: 13/925,895

(22) Filed: Jun. 25, 2013

(65) Prior Publication Data

US 2014/0375497 A1   Dec. 25, 2014

(51) Int. Cl.
| | |
|---|---|
| G01S 19/13 | (2010.01) |
| G01S 19/49 | (2010.01) |
| G01S 19/14 | (2010.01) |

(52) U.S. Cl.
CPC ............... *G01S 19/49* (2013.01); *G01S 19/14* (2013.01)

(58) Field of Classification Search
CPC ...................................... G01S 19/49
USPC .................................... 342/357.51
See application file for complete search history.

(56) References Cited

U.S. PATENT DOCUMENTS

| | | | |
|---|---|---|---|
| 5,257,195 A * | 10/1993 | Hirata | G01S 19/49 342/357.31 |
| 5,383,127 A | 1/1995 | Shibata | |
| 5,918,682 A | 7/1999 | Fan et al. | |
| 6,727,849 B1 * | 4/2004 | Kirk | G01C 15/00 342/357.52 |
| 7,349,802 B2 | 3/2008 | Lee et al. | |
| 7,831,388 B2 | 11/2010 | Chen et al. | |
| 7,873,472 B2 | 1/2011 | Zeng et al. | |
| 2007/0257837 A1 * | 11/2007 | Watanabe | G01S 19/49 342/357.37 |
| 2012/0221244 A1 * | 8/2012 | Georgy | G01C 21/165 701/472 |

FOREIGN PATENT DOCUMENTS

JP    2000284830    10/2000

* cited by examiner

*Primary Examiner* — Gregory C Issing
*Assistant Examiner* — Helena Seraydaryan
(74) *Attorney, Agent, or Firm* — Leydig, Voit & Mayer, Ltd.

(57) ABSTRACT

A method for detecting and mitigating errors in a positioning system includes receiving a first signal from a global navigation satellite system (GNSS) indicative of a first position and a second signal from the GNSS indicative of a second position of a machine, determining a difference between the first position and the second position, detecting an error in a current position of the machine when the difference between the first and the second position exceeds a threshold of one of (a) a maximum distance given a maximum velocity, and (b) an actual distance determined based on an output of an inertial sensor on the machine, and mitigating the detected error in the current position of the machine by switching from an output of the positioning system to a position output determined based upon the output of the inertial sensor to update the current position.

20 Claims, 3 Drawing Sheets

POSITIONING ERROR DETECTION AND MITIGATION SYSTEM AND METHOD

TECHNICAL FIELD

The present disclosure relates generally to positioning systems and, more particularly, to detecting and mitigating errors in a positioning system.

BACKGROUND

Typically, positioning signals received from positioning systems are presumed accurate. In addition, real-time kinematic (RTK) corrections from an external source (e.g., a base station) are used to further fine tune the position of a moving machine. Occasionally, an error in a solution obtained from a satellite system communicating with the positioning system, and/or the RTK corrections, cause a temporary jump in the position solution provided by receivers of the positioning system. This can be caused by various degradations such as signal multi-path effects or other disruptions to the signal received at the positioning system from the satellites. Short or long duration position errors may have a large impact in automation and autonomy applications.

Conventional positioning systems may typically only detect single discrete jumps. If the position jump lingers, then it would cause an error in the position output. Such conventional systems may look at signals from the individual satellites to determine when incorrect or erroneous positioning signals are being calculated or being received at a receiver.

U.S. Pat. No. 7,349,802 ('802 patent), entitled "APPARATUS AND METHOD FOR DETECTING VEHICLE LOCATION IN NAVIGATION SYSTEM," purports to address the problem of reducing continuously accumulated errors in determining an estimated vehicle location that becomes incorrect with time. The '802 patent discusses an apparatus for detecting a vehicle location in a navigation system, where a Global Positioning System (GPS) receiver receives a navigation message transmitted by a GPS satellite, a map data storage unit stores in advance digital map data therein, and a sensor unit detects a travel angle difference and a traveled distance of a vehicle and lateral and longitudinal inclinations of a road on which the vehicle travels. A control unit of the apparatus compares the value of Dilution of Precision (DOP) of the navigation message received by the GPS receiver with a predetermined threshold. If the value of DOP is less than a predetermined threshold, the control unit sets reference vehicle location information from vehicle location information detected using the navigation message. If the value of DOP is equal to or greater than the predetermined threshold, the control unit determines the reference vehicle location information by storing vehicle location information map-matched to the digital map data when the just previous value of DOP was less than the predetermined threshold, by accumulating detection signals from the sensor unit, and by using the stored vehicle location information and the accumulated detection signals from the sensor unit. The control unit estimates the vehicle location using the determined reference vehicle location information and the detection signals from the sensor unit, map-matches the estimated vehicle location to the digital map data stored in the map data storage unit, and outputs the map-matched results to display the map-matched digital map data and vehicle location on a screen of a display unit.

However, the discussion in the '802 patent does not address what happens when the satellite signal is not available, or when there is an error in the positioning system data with multiple jumps, or even when to decide whether or not an error in the satellite data has occurred. Accordingly, there is a need for accurate detection and mitigation of positioning errors.

SUMMARY

In one aspect, the disclosure provides a method for detecting and mitigating errors in a positioning system. The method includes receiving, at a processor, a first signal from a global navigation satellite system (GNSS) indicative of a first position of a machine and a second signal from the GNSS indicative of a second position of the machine. The method includes determining, at the processor, a difference between the first position and the second position. The method includes detecting, at the processor, an error in a current position of the machine when the difference between the first position and the second position exceeds a threshold of one of:
  (a) a maximum distance the machine could have traveled given a maximum velocity of the machine, and
  (b) an actual distance traveled by the machine determined based on an output of an inertial sensor on the machine.

The method includes mitigating, at the processor, the detected error in the current position of the machine by switching from an output of the positioning system to a position output determined based upon the output of the inertial sensor to update the current position.

In another aspect, the disclosure provides a positioning error detection and mitigation system including a processor. The processor is configured to receive a first signal from a global navigation satellite system (GNSS) indicative of a first position of a machine and a second signal from the GNSS indicative of a second position of the machine. The processor is configured to calculate a difference between the first position and the second position. The processor is configured to detect an error in a current position of the machine when the difference between the first position and the second position exceeds a threshold of one of:
  (a) a maximum distance the machine could have traveled given a maximum velocity of the machine, and
  (b) an actual distance traveled by the machine determined based on an output of an inertial sensor on the machine.

The processor is configured to mitigate the detected error in the current position of the machine by switching from an output of the positioning system to a position output determined based upon the output of the inertial sensor to update the current position.

In yet another aspect, the disclosure provides a computer readable medium storing computer executable instructions thereupon for detecting and mitigating position errors of a machine. The instructions when executed by a processor cause the processor to receive a first signal from a global navigation satellite system (GNSS) indicative of a first position of the machine and a second signal from the GNSS indicative of a second position of the machine. The instructions when executed by the processor cause the processor to calculate a difference between the first position and the second position. The instructions when executed by the processor cause the processor to detect an error in a current position of the machine when the difference between the first position and the second position exceeds a threshold of one of:

(a) a maximum distance the machine could have traveled given a maximum velocity of the machine, and (b) an actual distance traveled by the machine determined based on an output of an inertial sensor on the machine.

The instructions when executed by the processor cause the processor to mitigate the detected error in the current position of the machine by switching from an output of the positioning system to a position output determined based upon the output of the inertial sensor to update the current position.

DETAILED DESCRIPTION

Figure 1:
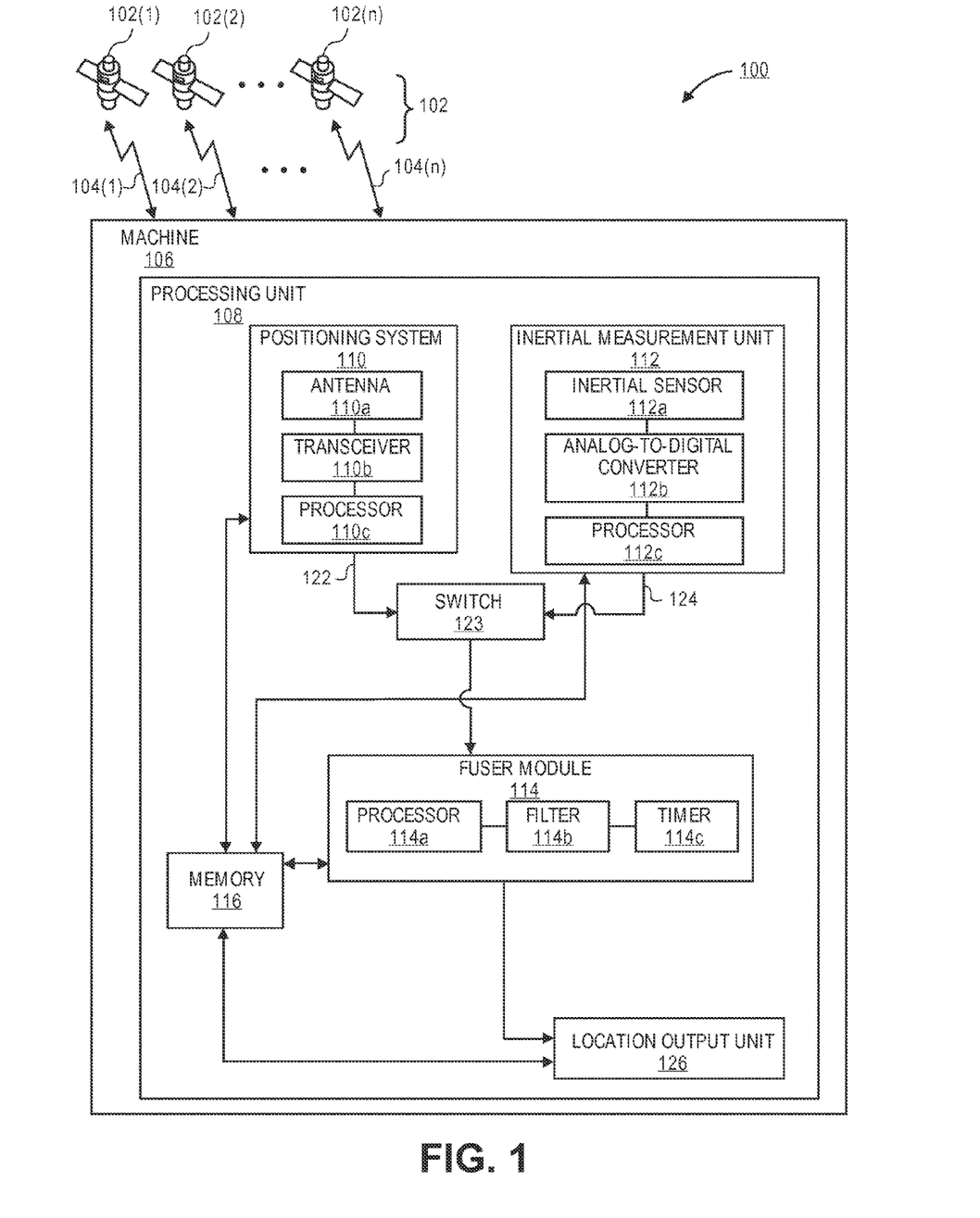
FIG. 1 is a diagram representing an aspect of a positioning error detection and mitigation system.

Now referring to the drawings, wherein like reference numbers refer to like elements, FIG. 1 illustrates an aspect of a positioning error detection and mitigation system 100. The positioning error detection and mitigation system 100 uses a global navigation satellite system (GNSS) 102 and includes a machine 106 in communication with the GNSS 102.

The GNSS 102 used by the positioning error detection and mitigation system 100 includes one or more satellites 102(1)-102(n), where 'n' is a positive integer. The GNSS 102 may include additional components such as base stations, communication towers, etc. that form the communication infrastructure for the GNSS 102. The GNSS 102 may be a Global Positioning System (GPS), a differential GPS, a Global'naya Navigatsionnaya Sputnikovaya Sistema (GLONASS) system, a Compass (or BeiDou) system, a Galileo system, combinations thereof, or other types of global satellite navigation and/or positioning systems. In one aspect, one or more satellites 102(1)-102(n) may be, or may form, a part of a single or a dual GPS system.

The one or more satellites 102(1)-102(n) may be operating in one or more of communication frequency bands known for satellite communications. The one or more satellites 102(1)-102(n) may include one or more transmission and reception antennas operating at down-link and uplink frequencies, power systems, navigation and control systems, etc. Internal structure of the one or more satellites 102(1)-102(n) is known and will not be described herein. The one or more satellites 102(1)-102(n) may be low-earth, medium-earth, or outer-space high altitude satellites, or combinations thereof.

According to one aspect, the one or more satellites 102(1)-102(n) communicate with the machine 106. Such communication may occur over one or more communication paths 104(1)-104(n) each carrying respective one or more electromagnetic signals. For example, the one or more communication paths may be wireless communication paths, although other types of communication paths or channels (e.g., free space optical) in addition to, or along with, wireless channels may be present. It is to be noted that although FIG. 1 shows the one or more satellites 102(1)-102(n) communicating with the machine 106, the one or more satellites 102(1)-102(n) may communicate with other machines, for example, machines similar to the machine 106. Additionally or optionally, the one or more satellites 102(1)-102(n) may communicate with each other.

According to one aspect, the machine 106 is a movable machine. By way of example only and not by way of limitation, the machine 106 may be an aircraft, a ship, a boat, a rail-car, an automobile, a bicycle, a tractor, a skid steer loader (SSL), a multi-terrain loader (MTL), a compact track loader (CTL), a compact wheel loader (CWL), or any movable machine whose motion is to be tracked or determined. The machine 106 may be movable along one or more directions. For example, the machine 106 may move along linear Cartesian axes, and/or along angular, cylindrical, or helical directions, and/or combinations thereof. Such motion of the machine 106 may be continuous or discrete in time.

The machine 106 includes, among other known components such as vehicular parts including tires, wheels, transmission, engine, motor, hydraulic systems, suspension systems, cooling systems, fuel systems, exhaust systems, chassis, ground engaging tools, and the like (not shown), a processing unit 108 (interchangeably referred to herein as a processor 108). In one aspect, the processing unit 108 is an integrated circuit (IC) chip that is fabricated to implement various features and functionalities of the aspects discussed herein. By way of example only and not by way of limitation, the processing unit 108 may be fabricated using a Complementary Metal Oxide Semiconductor (CMOS) fabrication technology. In one aspect, the processing unit 108 may be implemented as an Application Specific Integrated Circuit (ASIC), a Field Programmable Gate Array (FPGA), a System-on-a-Chip (SOC), or the like. In one aspect, the processing unit 108 may include a positioning system 110, an inertial measurement unit 112, a fuser module 114, a switch 123, a location output unit 126, and a memory 116. It is to be noted that the processing unit 108 may include other components such as packaging, input and output pins, heat sinks, signal conditioning circuitry, input devices, output devices, memory components, cooling systems, power systems and the like, which are not shown in FIG. 1. The components of the processing unit 108 are connected to and communicate with each other as represented by one or more unidirectional or bidirectional arrows, although additional connections (not shown) between various components of the processing unit 108 may exist.

In an exemplary internal arrangement of the processing unit 108, as illustrated in FIG. 1, the positioning system 110 includes an antenna 110a, a transceiver 110b coupled to the antenna 110a, and a processor 110c coupled to the transceiver 110b. An output of the positioning system 110 may be coupled to an input of the fuser module 114, e.g., via the switch 123. Additionally or optionally, the positioning system 110 may be coupled to the memory 116.

The antenna 110a of the positioning system 110 is in communication with the one or more satellites 102(1)-102(n) of the GNSS 102. By way of example only and not by way of limitation, the antenna 110a may be a "GPS/GLONASS SMD Chip Antenna" provided by Johanson Technology, Inc. of Camarillo, Calif. It is to be noted that although only one antenna (i.e., the antenna 110a) is shown, the positioning system 110 may include more than one antenna, for example, an array of antennas. Further, the antenna 110a may be tunable to various frequencies depending upon which of the one or more satellites 102(1)-102(n) the antenna 110a is communicating with. The antenna 110a is configured to receive one or more signals related to position and/or orientation of the machine 106 from the one or more satellites 102(1)-102(n). Likewise, the antenna 110a may be configured to transmit one or more signals related to position and/or orientation of the machine 106 to the one or more satellites 102(1)-102(n). The one or more signals received by the antenna 110a are then forwarded to the transceiver 110b for further processing.

The transceiver 110b is coupled to the antenna 110a and includes transmitter and receiver circuitry (not shown) to process the one or more signals received by the antenna 110a. The transceiver 110b may further include analog to digital converters (ADCs), digital to analog converters (DACs), oscillators, filters, amplifiers, mixers, and other components (not shown) of a transmitter-receiver circuit, as known. An output of the transceiver 110b is coupled to a processor 110c of the positioning system 110.

The processor 110c is configured to process the signals from the transceiver 110b. Such processing includes digital manipulation of data of the signals from the one or more satellites 102(1)-102(n), as well as data (e.g., position and/or orientation data) that may be transmitted to the one or more satellites 102(1)-102(n). In one aspect, the processor 110c may be a sub-processor or a co-processor to the processing unit 108. Alternatively, the processor 110c may be optional in which case the positioning system 110 relies upon the processing unit 108 and/or the processors 112c or 114a for its processing needs.

The inertial measurement unit 112 may include an inertial sensor 112a, an analog-to-digital converter (ADC) 112b, and a processor 112c. In one aspect, the inertial measurement unit 112 may be outside the processing unit 108 and connected to the processing unit 108 externally. The inertial measurement unit 112 may be coupled to one or more parts of the machine 106. For example, an input terminal of the inertial measurement unit 112 may be coupled to one or more wheels of the machine 106 to measure a distance moved by the machine 106, a speed or velocity, an orientation, or a heading of the machine 106 using the inertial sensor 112a, which measurements may be provided as an equivalent analog signal to the ADC 112b.

The inertial sensor 112a of the inertial measurement unit 112 may be a gyroscope, a piezoelectric sensor, a strain gage, a speed or velocity sensor, an odometer, or combinations thereof. The inertial sensor 112a may be coupled to the ADC 112b, which is further coupled to the processor 112c. The inertial sensor 112a has a known tolerance or error that is predetermined by the manufacturer of the inertial sensor 112a. For example, such known error or tolerance may be accounted for when the processing unit 108 relies upon the inertial measurement unit 112 for determining the position or orientation of the machine 106. The ADC 112b may be a conventional ADC that is configured to convert analog signals corresponding to the machine's 106 inertial parameters to a digital format for processing by the processor 112c. The processor 112c is configured to process the signals from the ADC 112b and output them to the fuser module 114. In one aspect, the processor 112c may be a sub-processor or a co-processor to the processing unit 108. Alternatively, the processor 112c may be optional in which case the inertial measurement unit 112 relies upon the processing unit 108 and/or the processors 110c or 114a for its processing needs.

An output 122 from the processing unit 108 and an output 124 from the inertial measurement unit 112 may be provided to the switch 123. The output 122 corresponds to an output of the positioning system 110 and the output 124 may correspond to an inertial system position of the machine 106. The output 122 may also provide data related to a known or predetermined error of the positioning system 110 (e.g., a Root Mean Square (RMS) error).

The switch 123 may be a bypass switch under normal operation such that both the output 122 and the output 124 are directly provided to the fuser module 114. The phrase "normal operation" may refer to a time period in which the output 122 of the positioning system 110 is known to be accurate. Otherwise, when a jump in a value of the output 122 from the positioning system 110 is detected, as discussed with respect to FIGS. 2 and 3, the switch 123 is configured to allow only the output 124 of the inertial measurement unit 112 to the fuser module 114. The decision to switch may be made by the processing unit 108 based on various factors as discussed with respect to FIGS. 2 and 3. The switch 123 may be a logic switch implemented on processing unit 108. Alternatively, the switch 123 may be an electronic switch, for example, a transistor or a diode based switch as known. The switch 123 may receive a control input (not shown) from the processing unit 108, or from an external source when the processing unit 108 is not present. In one aspect, the switch 123 may be bypassed and the position and/or the spatial orientation of the machine 106 may be provided directly to the fuser module 114. In one aspect, the switch 123 may be integrated with the fuser module 114.

The processing unit 108 includes the fuser module 114 coupled to and receiving inputs from the positioning system 110 and the inertial measurement unit 112. In one aspect, a processor 114a of the fuser module 114 is configured to fuse or accumulate the outputs of the positioning system 110 and the inertial measurement unit 112. In one aspect, the fuser module 114 may be an adder circuit implemented by the processor 114a. The output of the processor 114a is provided to a filter 114b. In one aspect, the filter 114b may be a Kalman filter, an extended Kalman filter, an "unscented" Kalman filter, or other types of known linear predictive filters that are configured to operate upon output data samples from the positioning system 110 and the inertial measurement unit 112. In one aspect, the filter 114b may receive the RMS error of the positioning system 110 that is used to adjust the output of the fuser module 114 provided to the location output unit 126. In one aspect, the fuser module 114 includes a timer 114c that provides a time count associated with the samples received at the filter 114b. In one aspect, the timer 114c may store or generate a predetermined timeout period corresponding to the positioning system 110 after which the positioning system's 110 output is presumed correct. Additionally or optionally, the timer 114c may output clock signals to the processor 114a. Such timing signals may be generated by the timer 114c using internal oscillators (e.g., precision crystal oscillators), as known. In one aspect, the fuser module 114 may provide a single fused output from the filter 114b to the location output unit 126.

Similar to processing unit 108, in one aspect, the processors 110c, 112c, and/or 114a may be implemented as an Application Specific Integrated Circuit (ASIC), a Field Programmable Gate Array (FPGA), a System-on-a-Chip (SOC), or the like.

In one aspect, the location output unit 126 includes a visual display unit that provides a location and a position of the machine 106 on a map, for example. For example, the visual display unit may be a touch-screen, although other types of display devices may be used. In one aspect, the location output unit 126 may include a data storage unit (not shown) to store current location and/or position of the machine 106. Additionally or optionally, the location output unit 126 may include an audio output device to indicate a current position and/or location of the machine 106 to an operator of the machine 106.

The memory 116 may be a random access memory (RAM) or other types of memory devices, as known. In one aspect, the memory 116 is configured to store various parameters or results associated with the positioning system 110, the inertial measurement unit 112, the fuser module 114, and/or the location output unit 126. In one aspect, the memory 116 may include a computer readable medium storing computer executable instructions thereupon for detecting and mitigating position errors of the machine 106, the instructions when executed by the processing unit 108, and/or the processors 110c, 112c, and/or 114a, cause the processing unit 108 and/or the one or more processors 110c, 112c, and/or 114a to carry out the processes or operations discussed with respect to FIGS. 2 and 3.

INDUSTRIAL APPLICABILITY

Figure 2:
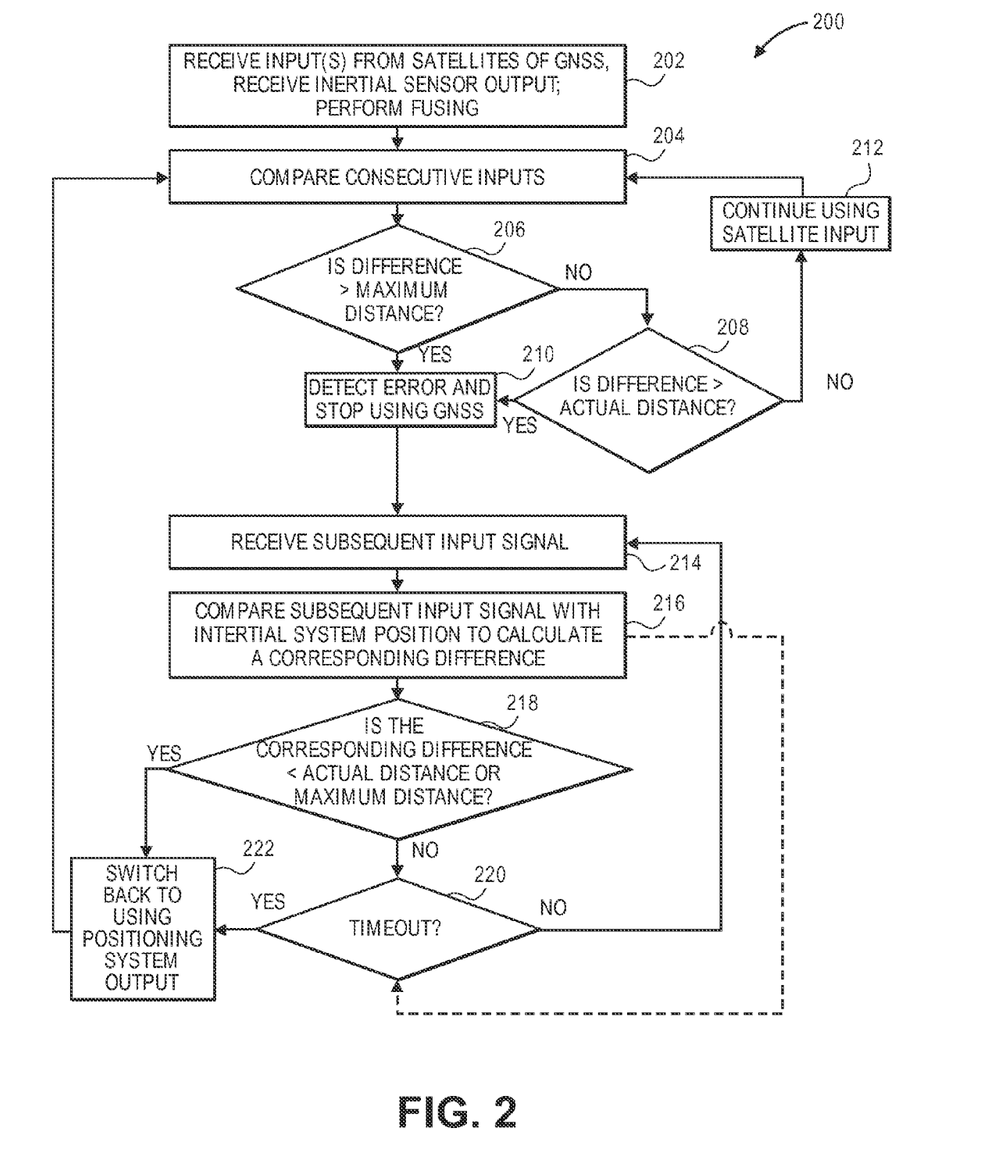
FIG. 2 presents a flowchart of an aspect for a process or a method of detecting and mitigating errors using the positioning error detection and mitigation system of FIG. 1.

The present disclosure is applicable generally to positioning systems and, more particularly, to detecting and mitigating errors of the positioning system 110. FIG. 2 presents a flowchart for a process or a method 200 of detecting and mitigating errors of the positioning system 110. Conventionally, positioning systems only detect single discrete jumps. If the position jump lingers, then it would cause an error in the position output. Such conventional systems may look at signals from the individual satellites to determine when bad positioning signals are coming in or being received at a receiver. Various aspects of the disclosure reject bad data (or, signals) from the GNSS 102 and then mitigate such bad data or error data to provide a correct location output of the machine 106.

In one aspect, one or more processes or operations in the method 200 may be carried out by a positioning system 110, or by the processing unit 108 and/or one or more of the processors 110c, 112c, and 114a of the machine 106, or by combinations thereof. Further, one or more processes may be skipped or combined as a single process, repeated several times, and the flow of processes in the method 200 may be in any order not limited by the specific order illustrated in FIG. 2. For example, operations 206 and 208, or operations 218 and 220 may be moved around in terms of their respective orders, or may be carried out in parallel with one or more processes.

The method 200 may begin in an operation 202 where the positioning system 110 of the processing unit 108 receives a plurality of signals as inputs from the one or more satellites 102(1)-102(n) of the GNSS 102 over the one or more communication paths 104(1)-104(n). The plurality of signals include a first signal from the GNSS 102 indicative of a first position, distance, and/or orientation of the machine 106 and a second signal from the GNSS 102 indicative of a second position, distance, and/or orientation of the machine 106. In particular, the plurality of signals from the one or more satellites 102(1)-102(n) of the GNSS 102 over the one or more communication paths 104(1)-104(n) may be utilized in a triangulation calculation to determine a position and/or orientation of the machine 106. As discussed, the machine 106 is movable and thus, has different positions or orientations as a function of time. During such movement of the machine 106, the positioning system 110 is in contact or communication with the GNSS 102 to inform the GNSS 102 of the current position. By way of example only and not by way of limitation, such positions of the machine 106 may include latitude and longitude coordinates of the machine 106. The orientation information for the machine 106 may include elevation, angular orientation, etc. In one aspect, the processing unit 108 may check whether or not the positioning system 110 is in communication with the GNSS 102 prior to detecting the plurality of signals having data regarding positions of the machine 106. Additionally in the operation 202, the processing unit 108 is configured to receive the output of the inertial measurement unit 112 at the fuser module 114. The fuser module 114 is configured to fuse the outputs of the positioning system 110 and the inertial sensor 112a to determine a current position of the machine 106. As discussed below, in certain conditions, the fuser module 114 may receive, via the switch 123, an individual output of the positioning system 110 at the output 122 and/or an individual output of the inertial sensor 112a of the inertial measurement unit 112 at the output 124. However, under normal operation, the fuser module 114 receives both the output 122 and the output 124 from the switch 123; or alternatively under normal operation, the fuser module 114 receives both the output 122 and the output 124 bypassing the switch 123.

In an operation 204, the processing unit 108 compares the consecutive inputs received by the positioning system 110 from the GNSS 102. For example, the processing unit 108 may compare the first signal and the second signal to determine a difference between the first position and the second position. Such determination of the difference may be done vectorially by calculating a difference vector between the position vectors corresponding to the first and the second positions of the machine 106. Similar comparison may be carried out for the different orientations of the machine 106. In one aspect, the difference may be expressed as a distance moved by the machine 106 or a change in an angular distance indicative of the orientation of the machine 106. In one aspect, the processing unit 108 may use the memory 116 to store the results of the comparison.

In an operation 206, the processing unit 108 determines whether the difference computed in the operation 204 is greater than a threshold. The threshold may be one or more of a maximum velocity or an actual velocity of the machine 106. For example, in the operation 206, the processing unit 108 determines if the difference is greater than a maximum distance or a maximum angular orientation the machine 106 could have traveled given a maximum velocity or a maximum angular velocity, respectively, of the machine 106 (e.g., using a standard integration of velocity over time). The processing unit 108 may obtain a value of the maximum velocity of the machine 106 from the memory 116, and/or from the processors 110c and/or 112c. Such a value of the maximum velocity may vary from machine to machine, or even for the same machine 106 under different circumstances. By way of example only, the processing unit 108 may use a value of 0.5 m as the threshold, although other values may be used. Under normal operation, for example at a given communication frequency, the machine's 106 position on the location output unit 126 may be displayed by a fixed amount of jumps in the displayed position (e.g., 0.2 m).

In one aspect, the discrete jumps in the current position provided by the positioning system 110 (e.g., based on the GNSS 102 and/or the inertial measurement unit 112), may be monitored with respect to changes in heading and/or velocity of the machine 106. The processing unit 108 may determine a heading vector that varies with time indicating the overall direction in which the machine 106 is moving or changing orientation as time passes. The processing unit 108 may then detect an error based upon changes to such heading of the machine 106 that are sudden or unexpected. Such sudden changes to heading may be detected based upon the known maximum or actual velocity of the machine 106, or based upon a predetermined route of the machine 106. When such changes to the heading are detected, the processing unit 108 may detect an error in the positioning system 110.

If the computed difference is not greater than the maximum distance, then in an operation 208, the processing unit 108 determines if the threshold has been exceeded such that the computed difference is more than an actual distance traveled by the machine 106 determined based on an output of the inertial sensor 112a on the machine 106. For example, the inertial sensor 112a may provide a heading of the machine 106, a speed, a velocity, an acceleration, or a distance traveled by the machine 106 value to the processing unit 108. Such values may be provided by the processor 112c of the inertial measurement unit 112 and stored in the memory 116 for further processing by the processing unit 108. If the processing unit 108 determines that the difference between the first position and the second position of the machine 106 (or, between any two consecutive positions) is not more than the actual distance moved by the machine 106, then in an operation 212, the processing unit 108 continues using the output signal from the positioning system 110, i.e., the output 122, as the default for the actual position of the machine 106.

However, when the computed difference in the operation 204 is greater than the maximum distance in operation 206, or is greater than the actual distance determined in the operation 208, then in an operation 210, the processing unit 108 detects an error in the output of the positioning system 110. Such an error may be indicated by a jump in the position of the machine 106 as indicated in a value of a signal on the output 122 or as displayed on the location output unit 126. The detection of the error by the processing unit 108 is mitigated by the switch 123 stopping the use of the GNSS 102 and switching to the output 124 corresponding to the inertial sensor's 112a output. That is, the current position of the machine 106 is then known based on measurements from the inertial sensor 112a and outputted by the inertial measurement unit 112. For example, such measurements by the inertial sensor 112a may be indicative of a heading, a velocity, an acceleration, etc., associated with the machine 106 depending upon a type of the inertial sensor 112a. The switch 123 may receive an instruction on a signal line (not shown) by the processing unit 108 to carry out such switching to the output 122. At this point, the processing unit 108 is said to be providing the position and/or orientation of the machine 106 by "dead reckoning," as associated with one or more measurements from the inertial sensor 112a of the inertial measurement unit 112. In one aspect, the processing unit 108 may set a flag in the memory 116 indicating that dead reckoning is being used to provide the position and/or orientation of the machine 106 to the location output unit 126.

In an operation 214, the processing unit 108 continues receiving one or more subsequent input signals from the GNSS 102 over one or more communication paths 104(1)-104(n). The one or more subsequent signals are indicative of corresponding one or more subsequent positions and/or orientations of the machine 106 as provided to the positioning system 110 by the GNSS 102. Although the processing unit 108 uses dead reckoning based upon the operation 210, the processing unit 108 continues to check for the accuracy of the positioning signals being received from the GNSS 102 by the positioning system 110.

In an operation 216, the processing unit 108 compares a subsequent input signal received from the GNSS 102 at the positioning system 110 with the inertial system position from the inertial sensor 112a outputted at the output 124 to calculate a difference. This new difference may be stored in the memory 116 for further processing by the processing unit 108 as discussed with respect to the following operations. In one aspect, the processing unit 108 may then read the timer 114c to carry out an operation 220 after the operation 216, as indicated by a chained arrow from the operation 216 to the operation 220.

Alternatively, in an operation 218 following the operation 216, the processing unit 108 determines whether the difference computed in the operation 216 is less than the actual distance moved by the machine 106 or the maximum possible distance that may be moved by the machine 106 in a given time observed using the timer 114c. If not, the flow proceeds to the operation 220. In one aspect, the operation 220 may be carried out independently of the result of the operation 218.

However, if in the operation 218, the processing unit 108 determines that the difference computed in the operation 216 is less than the actual distance moved by the machine 106 or the maximum allowable distance, in an operation 222, the processing unit 108 is configured to instruct the switch 123 to switch back to using the output 122 of the positioning system 110 based on the GNSS 102, or to allow the signal at the output 122 into the fuser module 114 via the switch 123 or directly. Upon switching back in the operation 222, the previously set flag in the memory 116 may be reset and the operations 204-220 are then carried out iteratively by the processing unit 108 and/or one or more processors 110c, 112c, 114a.

In the operation 220, the processing unit 108 determines whether after the switching to the output 124 corresponding to the dead reckoning, a predetermined timeout period has elapsed. In one aspect, the processing unit 108 may obtain such a timeout period from the memory 116 and/or from the timer 114c of the fuser module 114. Based upon the timeout period, the processing unit 108 determines whether or not to switch back to the output 122 corresponding to the positioning system 110, or allow the output 122 to be input to the fuser module 114. If the timeout period has elapsed, the processing unit 108 switches back to the positioning system's 110 output available at the output 122 and provides the location and/or orientation of the machine 106 to the location output unit 126 based upon the output of the positioning system 110, and therefore, based upon the GNSS 102, independent of or fused with the output 124 of the inertial measurement unit 112 at the fuser module 114. In this case, the processing unit 108 determines that the output 124 from the inertial measurement unit 112 may not be relied upon for a period longer than the timeout period. However, if the timeout period has not elapsed, the processing unit 108 continues executing the operations starting at the operation 214 in an iterative manner. As indicated by the chained arrow from the operation 216, the operation 220 may be carried out parallel to or independent of the operation 218, or may be carried out after the operation 218.

It is to be noted that although the operations 202-222 have been discussed as being carried out by the processing unit 108, the operations 202-222 may be carried out by one or more of processors 110c, 112c, and 114a. Further, the operations 202-222 may be split between the processing unit 108 and one or more of processors 110c, 112c, and 114a. Furthermore, additional processors may be provided on the machine 106 to carry out various operations 202-222 and the disclosure is not restricted to the processing unit 108 and processors 110c, 112c, and 114a.

Figure 3:
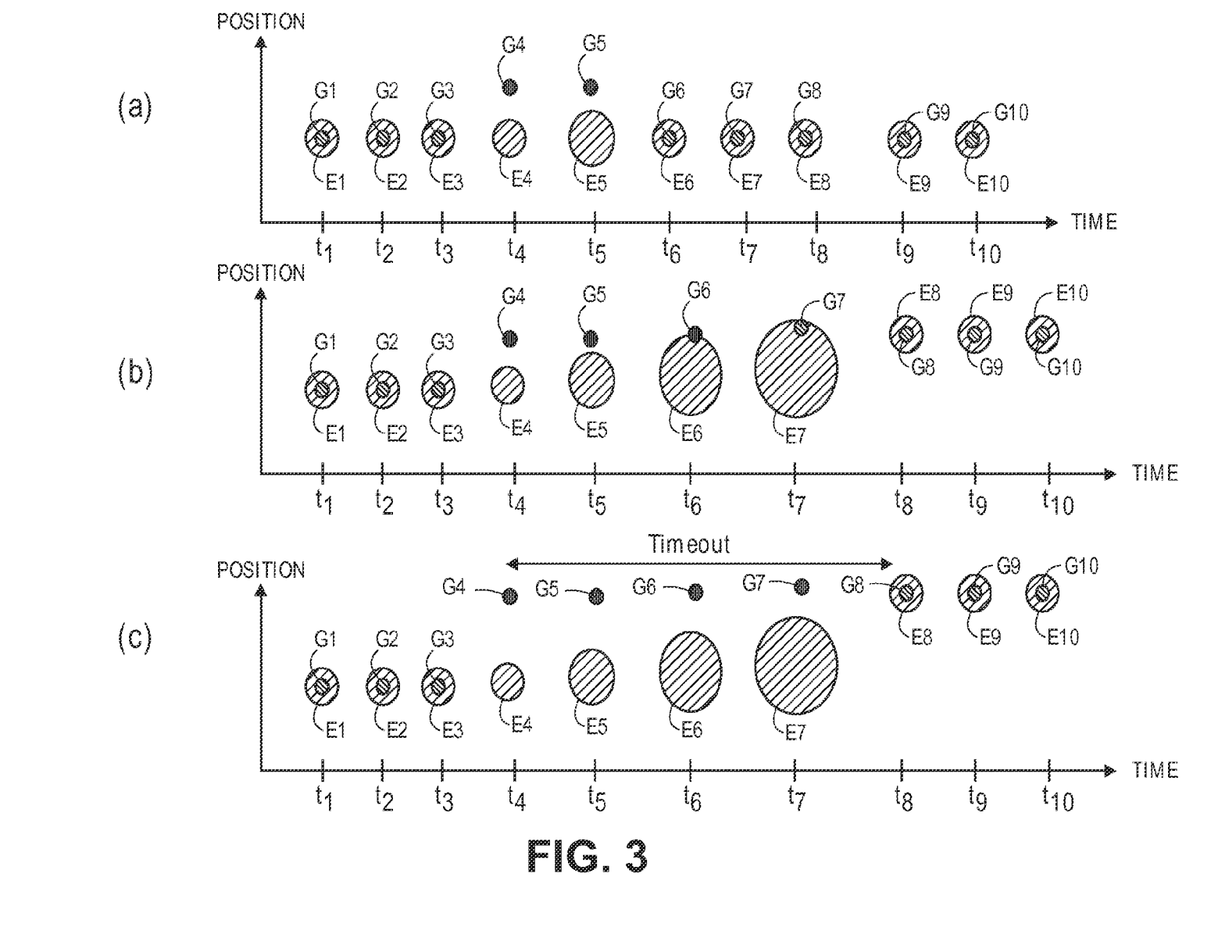
FIG. 3 presents plots for an aspect illustrating detecting and mitigating errors using positioning error detection and mitigation system of FIG. 1.

In one aspect, FIG. 3 presents exemplary plots (a), (b), and (c) for detecting and mitigating errors in the positioning system 110 of FIG. 1. In plots (a), (b), and (c), a first axis illustrates time indicated at time instants $t_1$-$t_{10}$ as an example. The time instants $t_1$-$t_{10}$ may be based upon the timer 114c, or may be obtained from a timing circuit (not shown) in the processing unit 108. It is to be noted that the interval between the time instants $t_1$-$t_{10}$ is for illustrative purposes only and is not meant to be restrictive. Further, the time on the first axes of the plots (a), (b), and (c) is in arbitrary units (a.u.). A second axis illustrates the location and/or orientation (also in a.u.) of the machine 106 in space, as provided to the location output unit 126. Specifically, in the plots (a), (b), and (c), the location and/or orientation of the machine 106 in space as obtained from the positioning system 110, e.g., based upon the GNSS 102 and/or inertial measurement unit 112, is illustrated by circles $G_1$-$G_{10}$. In one aspect, the circles $G_1$-$G_{10}$ may be representative of a heading or velocity of the machine 106, although other parameters, such as acceleration, etc., which are associated with a spatial change of the position or orientation of the machine 106 with time may be used. In yet another aspect, when the GNSS 102 is a dual GPS, the circles $G_1$-$G_{10}$ could be used to represent heading, pitch or roll (depending upon a configuration of the transceiver 110b). In the case of a dual GPS, the distance between two transceivers similar to transceiver 110b may be monitored to detect an error and start dead reckoning. Circles $E_1$-$E_{10}$ illustrate an error of the positioning system 110, e.g., the RMS error provided at the output 122. As illustrated, the circles $E_1$-$E_{10}$ are variable in size indicating an increasing or decreasing error with passage of time. It is to be noted that instead of circles, other shapes to indicate such errors may be used. In plots (a), (b), and (c), at time instants $t_1$-$t_3$, the position and/or orientation of the machine 106 as provided by the positioning system 110 (e.g., at the output 122) substantially falls within the error of the positioning system 110 in terms of the circles $G_1$-$G_3$ being inside the circles $E_1$-$E_3$. In this case, the positioning error detection and mitigation system 100 does not take any action as there is no indication of any error.

In the case of plot (a), at time instant $t_4$, the circle $G_4$ splits away or "jumps" from the circle $E_4$, indicating to the processing unit 108 that the location and/or orientation of the machine 106 provided by the positioning system 110 based on the GNSS 102 does not coincide with the location and/or orientation of the machine 106 provided by the inertial measurement unit 112. That is, the dead reckoning of the machine 106 does not match the output 122 associated with the positioning system 110. At time instant $t_5$, the error of the positioning system 110 may increase but the circle $G_5$ may still be outside the circle $E_5$ still indicating to the processing unit 108 that the location and/or orientation of the machine 106 provided by the positioning system 110 is not good. However, at the time instant $t_6$, the location and/or orientation provided by the positioning system 110, as indicated by the circle $G_6$, jumps back within the circle $E_6$ indicating that the outputs 122 and 124 match again. Such "jump back" occurs within the predetermined timeout period of the operation 222. Accordingly, the processing unit 108 of the positioning error detection and mitigation system 100 continues using a fused output from the fuser module 114 without any switching being performed by the switch 123.

The plot (b) illustrates another scenario where from the time instants $t_4$ to $t_7$, the circles $E_4$-$E_7$ incrementally advance in size to a maximum error value (at time instant $t_7$) of the positioning system 110 to encompass the location and/or position indicated by the positioning system 110 as the circle $G_7$. The time interval between the time instants $t_4$-$t_7$ falls within the predetermined timeout period of the operation 220. Accordingly, similar to plot (a), in plot (b), at the time instant $t_8$ the location and/or orientation provided by the positioning system 110 as indicated by the circle $G_8$ jumps back within the circle $E_8$ indicating that the outputs 122 and 124 match again. Accordingly, the processing unit 108 of the positioning error detection and mitigation system 100 continues using a fused output from the fuser module 114 without any switching being performed by the switch 123.

The plot (c) illustrates yet another scenario where from the time instants $t_4$ to $t_7$, the location and/or position of the machine 106 as indicated by the positioning system 110 falls outside or does not match the error of the positioning system 110. However, the predetermined timeout period of the operation 220 elapses between the time instants $t_7$ and $t_8$. In this scenario, in accordance with the operation 220, the processing unit 108 determines that the output of the positioning system 110 cannot be incorrect for a period greater than the timeout period. Further, the processing unit 108 determines that the error in the output of the positioning system 110 indicated by the circle $E_7$ has reached a maximum error value. Accordingly, at the time instant $t_8$, the processing unit 108 carries out the operation 222 by instructing the switch 123 to switch back to using the output 122 corresponding to the positioning system 110 from using dead reckoning based output 124 of the inertial measurement unit 112. This is indicated by the circles $G_8$-$G_{10}$ falling inside the circles $E_8$-$E_{10}$ from the time instants $t_8$ to $t_{10}$. Accordingly, depending upon various thresholds and timeout period(s), the positioning error detection and mitigation system 100 determines accurate position and/or orientation of the machine 106.

It will be appreciated that the foregoing description provides examples of the disclosed system and technique. However, it is contemplated that other implementations of the disclosure may differ in detail from the foregoing examples. Further, the various features of the positioning error detection and mitigation system 100 are not limited for the machine 106 only, and may additionally be used for other machines. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method for detecting and mitigating errors in a positioning system on a machine, comprising:

receiving, at a processor, a first position signal generated from a plurality of first signals received through an antenna on the machine from a global navigation satellite system (GNSS) indicative of a first position of a machine and a second position signal generated from a plurality of second signals received through the antenna on the machine from the GNSS indicative of a second position of the machine;

determining, at the processor, a difference between the first position and the second position;

determining, at the processor, an actual distance traveled by the machine based on an output of an inertial sensor on the machine;

detecting, at the processor, a first error in a current position of the machine when the difference between the first position and the second position exceeds a first threshold of a maximum distance the machine could have traveled given a maximum velocity of the machine;

upon the difference between the first position and the second position not exceeding the threshold of the maximum distance the machine could have traveled given the maximum velocity of the machine, detecting, at the processor, a second error in the current position of the machine when the difference between the first position and the second position exceeds a second threshold of the actual distance traveled by the machine determined based on the output of the inertial sensor on the machine; and mitigating, at the processor, the detected first error and the detected second error in the current position of the machine by switching from an output of the positioning system to a position output determined based upon the output of the inertial sensor to update the current position.

2. The method of claim 1 further comprising:
switching back, at a switch of the processor, to the output of the positioning system based on the GNSS when a subsequent signal received from the GNSS and indicative of a subsequent position of the machine results in a difference between an inertial system position and the subsequent position to be less than the applicable threshold.

3. The method of claim 2, wherein the difference is indicative of a distance moved by the machine.

4. The method of claim 1 further comprising:
switching back to the output of the positioning system based on the GNSS after a predetermined timeout period using the switch.

5. The method of claim 2 further comprising:
determining at least one of a heading, a pitch, and a roll of the machine to detect the error when the positioning system is a dual Global Positioning System (GPS).

6. A positioning error detection and mitigation system, comprising:
a positioning system on a machine and including an antenna, the positioning system generating a position signal from a plurality of signals received from a global navigation satellite system (GNSS) indicative of a position of a machine;
an inertial measurement system including an inertial sensor on the machine, the inertial measurement system generating an output indicative of an actual distance traveled by the machine; and
a processor configured to:
receive a first position signal from the GNNS indicative of a first position of the machine and a second position signal from the GNSS indicative of a second position of the machine;
calculate a difference between the first position and the second position;
determine the actual distance traveled by the machine based on the output of the inertial sensor;

detect a first error in a current position of the machine when the difference between the first position and the second position exceeds a threshold of a maximum distance the machine could have traveled given a maximum velocity of the machine;

upon the difference between the first position and the second position not exceeding the threshold of the maximum distance the machine could have traveled given the maximum velocity of the machine, detect a second error in the current position of the machine when the difference between the first position and the second position exceeds a second threshold of the actual distance traveled by the machine determined based on the output of the inertial sensor; and mitigate the detected first error and the detected second error in the current position of the machine by switching from an output of the positioning system to a position output determined based upon the output of the inertial sensor to update the current position.

7. The positioning error detection and mitigation system of claim 6, wherein the inertial sensor is configured to measure at least one of a heading, a velocity, or the actual distance moved by the machine.

8. The positioning error detection and mitigation system of claim 6, wherein the processor is further configured to:
switch back to the output of the positioning system based on the GNSS when a subsequent signal received from the GNSS and indicative of a subsequent position of the machine results in a difference between an inertial system position and the subsequent position to be less than the applicable threshold.

9. The positioning error detection and mitigation system of claim 6, wherein the processor is further configured to:
switch back to the output of the positioning system after a predetermined timeout period.

10. The positioning error detection and mitigation system of claim 8, wherein the difference is indicative of a distance moved by the machine.

11. The positioning error detection and mitigation system of claim 6, wherein the processor is further configured to:
fuse the outputs of the positioning system and the inertial sensor to determine the current position of the machine.

12. The positioning error detection and mitigation system of claim 6, wherein the positioning system providing the output to the processor is a Global Positioning System (GPS).

13. The positioning error detection and mitigation system of claim 6, wherein the machine is a tractor, a skid steer loader (SSL), a multi-terrain loader (MTL), a compact track loader (CTL), a compact wheel loader (CWL), or a movable machine.

14. The positioning error detection and mitigation system of claim 6, wherein the processor is further configured to:
store one or more subsequent positions of the machine in a memory for processing.

15. A computer readable medium storing computer executable instructions thereupon for detecting and mitigating position errors of a machine, the instructions when executed by a processor cause the processor to:
receive a first position signal generated from a plurality of first signals received through a antenna on the machine from a global navigation satellite system (GNSS) indicative of a first position of the machine and a second position signal generated from a plurality of second signals received through the antenna on the machine-from the GNSS indicative of a second position of the machine;

calculate a difference between the first position and the second position;

determine an actual distance traveled by the machine based on an output of an inertial sensor on the machine;

detect a first error in a current position of the machine when the distance between the first position and the second position exceeds a first threshold of a maximum distance the machine could have traveled given a maximum velocity of the machine;

upon the difference between the first position and the second position not exceeding the threshold of the maximum distance the machine could have traveled given the maximum velocity of the machine, detect a second error in the current position of the machine when the difference between the first position and the second position exceeds a second threshold of the actual distance traveled by the machine determined based on the output of the inertial sensor on the machine; and mitigate the detected first error and the detected second error in the current position of the machine by switching from an output of the positioning system to a position output determined based upon the output of the inertial sensor to update the current position.

16. The computer readable medium of claim 15, wherein the instructions when executed by the processor, further cause the processor to:

switch back to the output of the positioning system based on the GNSS when a subsequent signal received from the GNSS and indicative of a subsequent position of the machine results in a difference between an inertial system position and the subsequent position to be less than the applicable threshold.

17. The computer readable medium of claim 15, wherein the instructions when executed by the processor, further cause the processor to:

switch back to the output of the positioning system after a predetermined timeout period.

18. The computer readable medium of claim 16, wherein the difference is indicative of a distance moved by the machine.

19. The computer readable medium of claim 15 wherein the instructions when executed by the processor, further cause the processor to:

fuse the outputs of the positioning system and the inertial sensor to determine the current position of the machine.

20. The computer readable medium of claim 15, wherein the positioning system providing the output to the processor is a single or a dual Global Positioning System (GPS).

* * * * *

UNITED STATES PATENT AND TRADEMARK OFFICE
CERTIFICATE OF CORRECTION

PATENT NO. : 9,529,092 B2  
APPLICATION NO. : 13/925895  
DATED : December 27, 2016  
INVENTOR(S) : Friend et al.

Page 1 of 1

It is certified that error appears in the above-identified patent and that said Letters Patent is hereby corrected as shown below:

In the Claims

Column 13, Line 60, Claim 6, delete "GNNS" and insert -- GNSS --.

Signed and Sealed this
Second Day of May, 2017

Michelle K. Lee
*Director of the United States Patent and Trademark Office*